United States Patent
D'Alessandro et al.

(10) Patent No.: US 6,292,258 B1
(45) Date of Patent: Sep. 18, 2001

(54) LASER RECEIVER WITH OUT-OF-PLUMB INDICATION AND COMPENSATION

(75) Inventors: Richard D'Alessandro, Tipp City; Jonathan Appleget Jackson, Dayton; Edward E. Hart, Springfield; Robert Matthew Perchak, Dayton, all of OH (US)

(73) Assignee: Spectra Precision, Inc., Dayton, OH (US)

( * ) Notice: Subject to any disclaimer, the term of this patent is extended or adjusted under 35 U.S.C. 154(b) by 0 days.

(21) Appl. No.: 09/363,576

(22) Filed: Jul. 29, 1999

(51) Int. Cl.$^7$ ............................ G01C 3/08; G01C 1/10; G01B 11/26
(52) U.S. Cl. ................... 356/4.08; 356/139.1; 356/148
(58) Field of Search ............................. 356/148, 139.1, 356/4.08

(56) References Cited

U.S. PATENT DOCUMENTS

| | | |
|---|---|---|
| 3,617,131 * | 11/1971 | Taguchi . |
| 4,107,643 * | 8/1978 | Rhodes . |
| 4,225,226 | 9/1980 | Davidson et al. . |
| 4,600,997 | 7/1986 | Cain et al. . |
| 4,627,172 | 12/1986 | Afromowitz . |
| 4,676,634 | 6/1987 | Petersen . |
| 4,693,598 | 9/1987 | Sehr . |
| 4,730,920 | 3/1988 | Schlemmer et al. . |
| 4,830,489 | 5/1989 | Cain et al. . |
| 4,895,440 | 1/1990 | Cain et al. . |
| 4,907,874 | 3/1990 | Ake . |
| 4,926,050 | 5/1990 | Shemwell . |
| 5,000,564 | 3/1991 | Ake . |
| 5,079,845 | 1/1992 | Childers . |
| 5,182,863 | 2/1993 | Rando . |
| 5,189,484 | 2/1993 | Koschmann et al. . |
| 5,287,627 | 2/1994 | Rando . |
| 5,323,475 * | 6/1994 | Marsden et al. ................ 385/77 |
| 5,375,663 | 12/1994 | Teach . |
| 5,471,049 | 11/1995 | Cain . |
| 5,537,201 * | 7/1996 | Kumagai et al. ............... 356/4.08 |
| 5,886,776 | 3/1999 | Yost et al. . |
| 5,917,587 * | 6/1999 | Rando ............................ 356/149 |

* cited by examiner

Primary Examiner—Stephen C. Buczinski
(74) Attorney, Agent, or Firm—Killworth, Gottman, Hagan, Schaeff, LLP

(57) ABSTRACT

A laser receiver is provided that is capable of providing an accurate indication of laser receiver tilt and correcting a generated elevation signal based upon the indicated laser receiver tilt. In accordance with one embodiment of the present invention, a laser receiver is provided comprising a laser beam detection unit, an inclination detection unit, and suitable laser receiver control circuitry. The laser beam detection unit is arranged to enable production of an elevation signal indicative of an elevation of a laser beam relative to the laser receiver. The inclination detection unit comprises a reference light source, an optical fiber, and an optical detector. The optical fiber defines a light input end and a light output end and is coupled to the reference light source such that light from the reference light source enters at the light input end and exits from the light output end as an output beam of light. The optical detector is arranged to receive the output beam of light. The inclination detection unit is arranged to permit the output end of the optical fiber to move relative to the optical detector as the primary receiver axis tilts relative to a vertical reference axis. The optical detector is arranged to produce an optical detection signal indicative of a position of the output beam on the optical detector. The laser receiver control circuitry is arranged to generate a receiver tilt signal from the optical detection signal. The receiver tilt signal is indicative of a degree to which the primary receiver axis is tilted relative to the vertical reference axis. The laser receiver control circuitry is also arranged to correct the elevation signal as a function of the receiver tilt signal.

19 Claims, 4 Drawing Sheets

LASER RECEIVER WITH OUT-OF-PLUMB INDICATION AND COMPENSATION

BACKGROUND OF THE INVENTION

The present invention relates to laser beam receivers and, more particularly, to laser beam receiver units arranged to detect the presence and elevation of a rotating reference laser beam.

Rotating laser beams are commonly used in the fields of civil engineering, construction, agriculture, and surveying to establish a reference plane of light. U.S. Pat. No. 5,033,847, issued Jul. 23, 1991, illustrates a laser transmitter which provides such a rotating reference beam. Photosensitive laser beam receivers are frequently used to monitor the elevation of the reference plane of light. A conventional photosensitive laser beam receiver circuit is described in U.S. Pat. No. 4,693,598, issued Sep. 15, 1987. Many conventional laser receiver circuits employ a plurality of photodetectors disposed in a vertical row. The signals produced by the photodetectors in response to the incidence of a laser beam upon the detector array are utilized to provide an indication of the elevation of the laser beam. The indication may be displayed graphically in an array of LED's or as a numerical value on a visual display.

The above-described laser receivers are designed to provide an accurate indication of laser beam elevation. However, the accuracy of the elevation measurement is limited significantly if the laser receiver is not arranged in a vertical orientation. Indeed, it is often difficult for operators to position a laser receiver close to vertical because the associated terrain may skew their frame of reference. Further, it is often difficult for operators to maintain the receiver at vertical because adverse working conditions and physical constraints of the work environment may make it difficult to stabilize the receiver. Accordingly, there is a need for a laser receiver that is characterized by reduced vulnerability to environmental factors that lead to inadvertent, undetected, or undue laser receiver tilt.

BRIEF SUMMARY OF THE INVENTION

This need is met by the present invention wherein a laser receiver is provided that is capable of providing an accurate indication of laser receiver tilt. Further, the laser receiver of the present invention is capable of correcting a generated elevation signal based upon the indicated laser receiver tilt.

In accordance with one embodiment of the present invention, a laser receiver is provided comprising a laser beam detection unit, an inclination detection unit, and suitable laser receiver control circuitry. The laser beam detection unit is arranged to enable production of an elevation signal indicative of an elevation of a laser beam relative to the laser receiver. The inclination detection unit comprises a reference light source, an optical fiber, and an optical detector. The optical fiber defines a light input end and a light output end and is coupled to the reference light source such that light from the reference light source enters at the light input end and exits from the light output end as an output beam of light. The optical detector is arranged to receive the output beam of light. The inclination detection unit is arranged to permit the output end of the optical fiber to move relative to the optical detector as the primary receiver axis tilts relative to a vertical reference axis. The optical detector is arranged to produce an optical detection signal indicative of a position of the output beam on the optical detector. The laser receiver control circuitry is arranged to generate a receiver tilt signal from the optical detection signal. The receiver tilt signal is indicative of a degree to which the primary receiver axis is tilted relative to the vertical reference axis. The laser receiver control circuitry is also arranged to correct the elevation signal as a function of the receiver tilt signal.

The inclination detection unit may further comprise an index matching compound positioned in an optical path defined between the reference light source and the light input end of the optical fiber. The index matching compound may be arranged to bond the reference light source to the light input end of the optical fiber. The inclination detection unit may further comprise an input lens positioned in an optical path defined between the reference light source and the light input end of the optical fiber. The input lens is preferably arranged to direct light from the reference light source into the input end of the optical fiber.

The inclination detection unit preferably further comprises an optical frame and a ferrule arranged about the optical fiber proximate the light input end. The ferrule is mechanically coupled to the optical frame and is arranged to mechanically isolate the light input end from fiber movement proximate the light output end of the optical fiber. The output end of the optical fiber may be provided with an output lens arranged to focus the output beam of light on the optical detector. The optical detector may comprise any one of a number of commercially available detectors; however, preferably, the detector should comprise a quadrant cell optical detector.

The optical detector defines a vertical reference point at the center of an X-axis and an orthogonal Y-axis. The laser receiver control circuitry may be operative to generate the receiver tilt signal from a first signal x indicative of a position of a centroid of the output beam of light relative to the X-axis and a second signal y indicative of a position of a centroid of the output beam of light relative to the Y-axis. The receiver control circuitry is preferably arranged to correct the elevation signal by reducing an elevation value corresponding to the elevation signal. The reduction is a function of a degree of receiver tilt.

The inclination detection unit may further comprise a pendulum mass coupled to the optical fiber proximate the light output end of the optical fiber and a magnetic damping mechanism arranged to damp motion of the pendulum mass relative to the primary receiver axis. The magnetic damping mechanism may include a magnet assembly defining a magnetic damping field and the pendulum mass may be arranged to define an eddy current disk configured to move through the magnetic damping field as the primary receiver axis tilts relative to the vertical reference axis.

The receiver may further comprise an audible signal generator responsive to the receiver tilt signal. The audible signal generator may be arranged to generate an audible tilt warning when the receiver tilt signal exceeds a predetermined value. The receiver may further comprise a visual signal generator responsive to the receiver tilt signal and the visual signal generator may be arranged to generate a visual representation of the receiver tilt signal.

In accordance with another embodiment of the present invention, a laser receiver is provided comprising a laser beam detection unit, an inclination detection unit, and laser receiver control circuitry. The laser beam detection unit is arranged to enable production of an elevation signal indicative of the elevation of a laser beam relative to the laser receiver. The inclination detection unit comprises a reference light source, an optical fiber, an optical detector, pendulum mass, and a magnetic damping mechanism. The optical fiber defines a light input end and a light output end and is coupled to the reference light source such that light from the reference light source enters at the light input end and exits from the light output end as an output beam of light. The optical detector is arranged to receive the output beam of light. The inclination detection unit is arranged to permit the output end of the optical fiber to move relative to the optical detector as the primary receiver axis tilts relative to a vertical reference axis. The optical detector is arranged to produce an optical detection signal indicative of a position of the output beam on the optical detector. The laser receiver control circuitry is arranged to generate a receiver tilt signal from the optical detection signal. The receiver tilt signal is indicative of a degree to which the primary receiver axis is tilted relative to the vertical reference axis.

The pendulum mass is coupled to the optical fiber proximate the light output end of the optical fiber. A magnetic damping mechanism is arranged to damp motion of the pendulum mass relative to the primary receiver axis. The magnetic damping mechanism includes a magnet assembly defining a magnetic damping field. The pendulum mass is arranged to define an eddy current disk configured to move through the magnetic damping field as the primary receiver axis tilts relative to the vertical reference axis.

In accordance with yet another embodiment of the present invention, a laser receiver is provided comprising a laser beam detection unit, an inclination detection unit, and laser receiver control circuitry. The laser beam detection unit is arranged to enable production of an elevation signal indicative of an elevation of a laser beam relative to the laser receiver. The inclination detection unit comprises a reference light source, an optical fiber, an optical detector, an index matching compound, an input lens, a ferrule, and an output lens. The optical fiber defines a light input end and a light output end and is coupled to the reference light source such that light from the reference light source enters at the light input end and exits from the light output end as an output beam of light. The optical detector is arranged to receive the output beam of light. The inclination detection unit is arranged to permit the output end of the optical fiber to move relative to the optical detector as the primary receiver axis tilts relative to a vertical reference axis. The optical detector is arranged to produce an optical detection signal indicative of a position of the output beam on the optical detector. The laser receiver control circuitry is arranged to generate a receiver tilt signal from the optical detection signal. The receiver tilt signal is indicative of a degree to which the primary receiver axis is tilted relative to the vertical reference axis.

The index matching compound is positioned in an optical path defined between the reference light source and the light input end of the optical fiber. The input lens is positioned in an optical path defined between the reference light source and the light input end of the optical fiber. The input lens is arranged to direct light from the reference light source into the input end of the optical fiber. The ferrule is arranged about the optical fiber proximate the light input end of the optical fiber and is arranged to mechanically isolate the light input end from fiber movement proximate the light output end of the optical fiber. The output lens is arranged to focus the output beam of light on the optical detector.

Accordingly, it is an object of the present invention to provide a robust laser receiver capable of providing an accurate indication of laser receiver tilt and correcting a generated elevation signal based upon the indicated laser receiver tilt. It is a further object of the present invention to provide a laser receiver that is characterized by reduced vulnerability to environmental factors that lead to inadvertent, undetected, or undue laser receiver tilt. These and other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
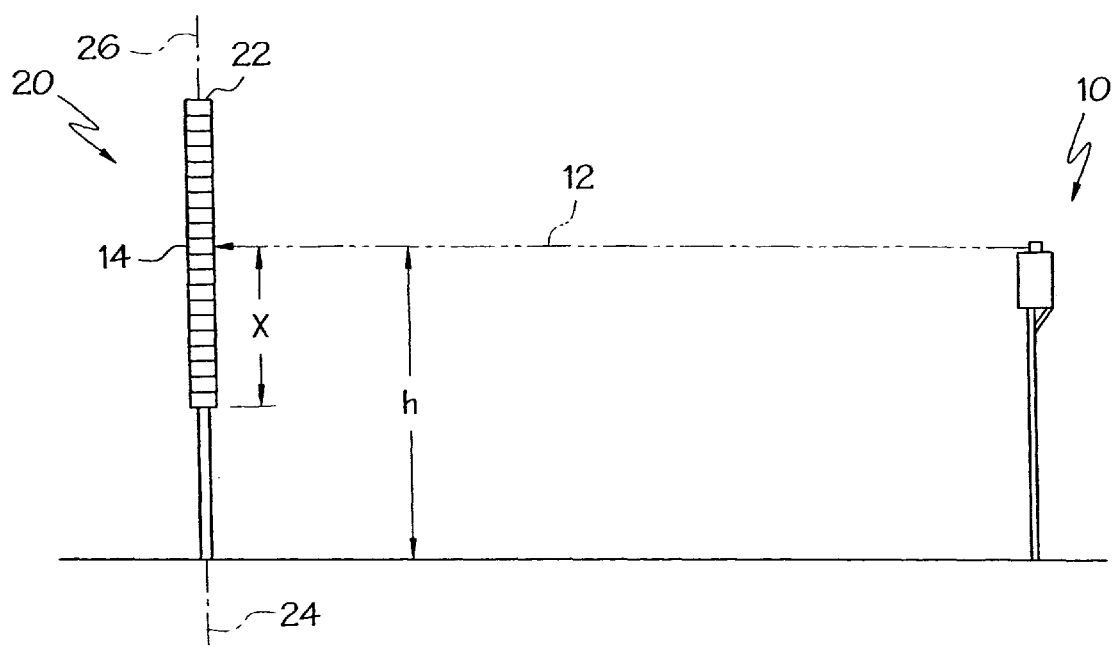
FIG. 1 is an illustration of a laser transmitter and a vertically aligned laser receiver.
Figure 2:
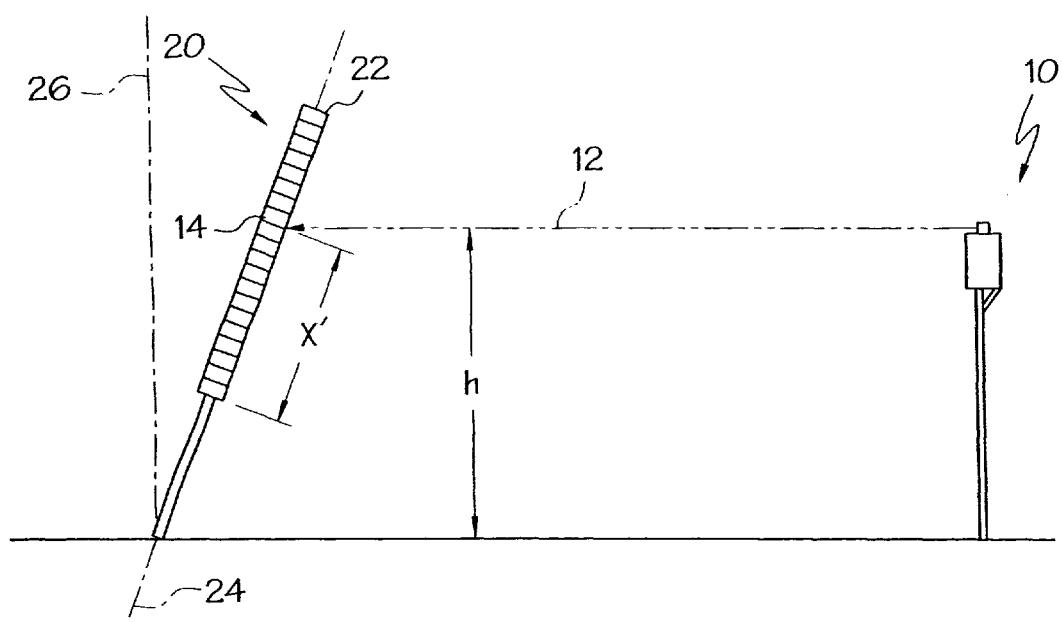
FIG. 2 is an illustration of a laser transmitter and a tilted laser receiver.

Referring initially to FIGS. 1 and 2, a laser transmitter 10, a laser receiver 20, and the manner in which an inaccurate laser beam elevation signal is generated by a tilted laser receiver 20 are illustrated. In the arrangement of FIG. 1, the laser transmitter 10 is arranged to generate a rotating reference laser beam 12 in a generally horizontal plane. The laser receiver 20 defines a primary receiver axis 24 that is oriented along a substantially vertical reference axis 26 and includes a photodetector array 22. As will be appreciated by those practicing the present invention, the structure of the laser transmitter 10 is beyond the scope of the present invention and may be gleaned from any one of a variety of laser transmitters available from Spectra Precision, Dayton, Ohio.

The receiver 20 generates a signal indicative of the position of the centroid 14 of the reference laser beam 12 on the photodetector array 22. The specific manner in which the laser receiver 20 generates the signal is also beyond the scope of the present invention but may be gleaned from any one of a number of conventional photodetector array designs as represented in the following U.S. Pat. Nos. 5,886,776 (Yost et al.); 5,189,484 (Koschmann et al.); 4,907,874 (Ake); 4,730,920 (Schlemmer et al.); 4,693,598 (Sehr); and 4,676,634 (Petersen). The elevation signal generated by the laser receiver 20 provides an indication of the height h of the reference laser beam 12 as a function of the distance x of the laser beam from the center, top, or bottom of the array 22.

The elevation signal is generally accurate as long as the primary receiver axis 24 is oriented along a substantially vertical reference axis 26 (see FIG. 1). However, referring to FIG. 2, if the primary receiver axis 24 is tilted with respect to the vertical reference axis 26, the distance x increases to an artificially large value x' and, as a result, an inaccurate elevation signal is produced by the laser receiver 20. As will be appreciated by those practicing the present invention, the degree of tilt is exaggerated in FIG. 2 to provide a clear illustration of the present invention.

Figure 3:
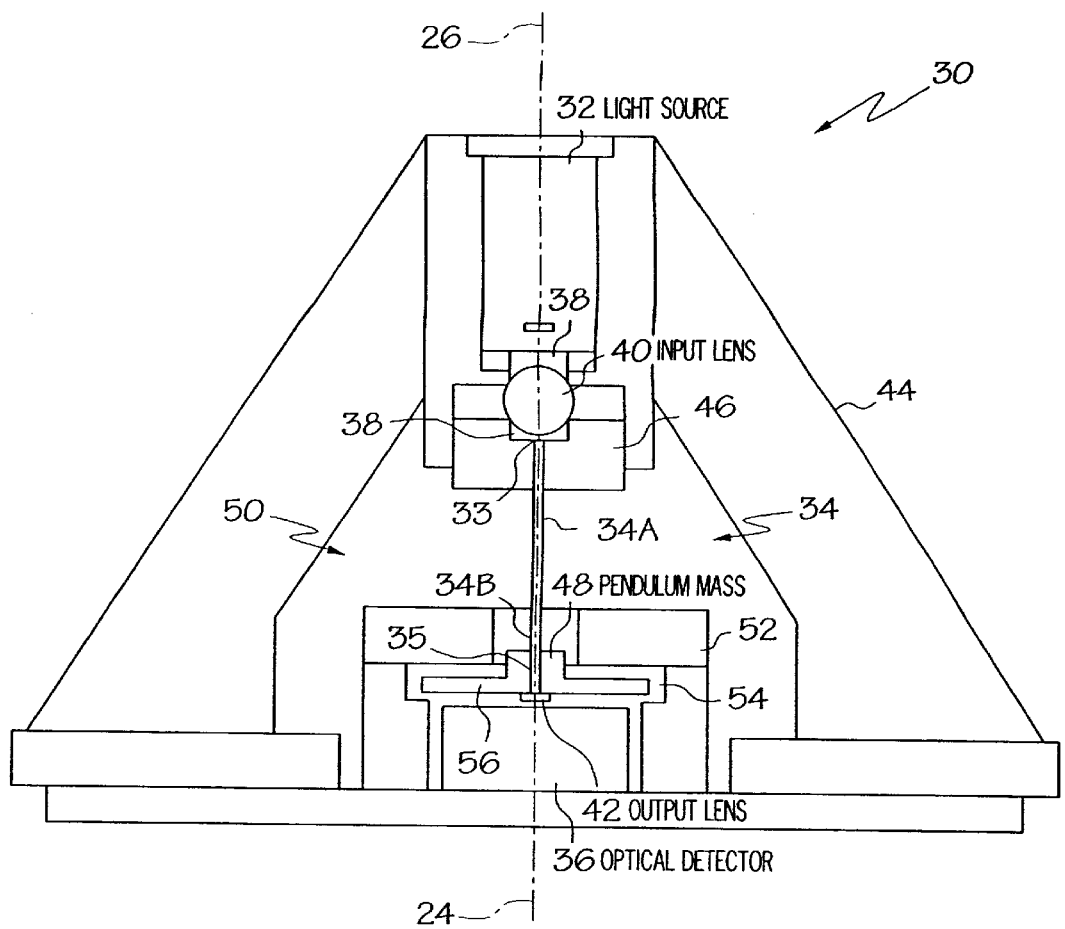
FIG. 3 is a schematic illustration of selected optical components of the laser receiver out-of-plumb indicator and compensator of the present invention.

Referring now to FIG. 3, an inclination detection unit 30 according to the present invention is illustrated in detail. The inclination detection unit 30 is incorporated in the structure of the laser receiver 20 and comprises a reference light source 32, an optical fiber 34, an optical detector 36, an index of refraction matching compound 38, an input lens 40, an output lens 42, an optical frame 44, a ferrule 46, a pendulum mass 48, and magnetic damping mechanism 50. The optical frame 44 may be shared by the inclination detection unit 30 and the optical system of the laser receiver 20. Alternatively, the inclination detection unit 30 and the optical system of the laser receiver 20 may be coupled to separate frames that are mechanically coupled to one another so as to be fixed relative to the primary receiver axis 24. In this manner, the orientation of the inclination detection unit 30 accurately represents the orientation of the optical system of the laser receiver 20.

The optical fiber 34 defines a light input end 33 and a light output end 35 and is coupled to the reference light source 32 such that light from the reference light source 32 enters at the light input end 33 as an input beam of light and exits from the light output end 35 as an output beam of light. The optical fiber 34 may be any commercially available fiber that allows for frequent and uniform fiber bending. A suitable optical fiber, for example, is a quartz fiber provided with a thin cladding that encourages frequent and uniform bending.

The index matching compound 38 is positioned in the optical path defined between the reference light source 32 and the light input end 33 of the optical fiber 34. The index matching compound 38 may be arranged to bond the reference light source 32 directly to the light input end 33 of the optical fiber 34 or, as is the case in the illustrated embodiment, the input lens 40 may be positioned in the optical path between the reference light source 32 and the light input end 33 of the optical fiber 34. The input lens 40 functions to direct light from the reference light source 32 into the input end 33 of the optical fiber 34. As is illustrated in FIG. 3, the index matching compound 38 may be provided on opposite faces of the input lens 40. The output end 35 of the optical fiber 34 is provided with an output lens 42 arranged to direct the output beam of light to the optical detector 36 as a beam spot. The size of the beam spot is optimized by the output lens. Preferably, the output lens 42 is designed such that the beam spot is small enough to ensure that the entire beam spot stays within the active area of the optical detector as the receiver tilts within a predetermined range. Where the optical detector 36 is a quad cell detector, the output lens 42 is further designed such that the beam spot is large enough to occupy significant portions of each of the cell areas (described below with reference to FIGS. 4 and 5).

The optical detector 36 is positioned and arranged to receive the output beam of light. The output end 35 of the optical fiber 34 is free to move relative to the optical detector 36 as the primary receiver axis 24 tilts relative to the vertical reference axis 26. As a result, the position of incidence of the output beam of light on the optical detector 36 varies as a function of the degree to which the primary receiver axis 24 tilts relative to the vertical reference axis 26. The optical detector 36 is arranged to produce an optical detection signal indicative of a position of the output beam on the optical detector 36. As is described in detail below, the position signal enables calculation of the degree of receiver tilt and correction of the reference laser beam height indication.

Figure 4:
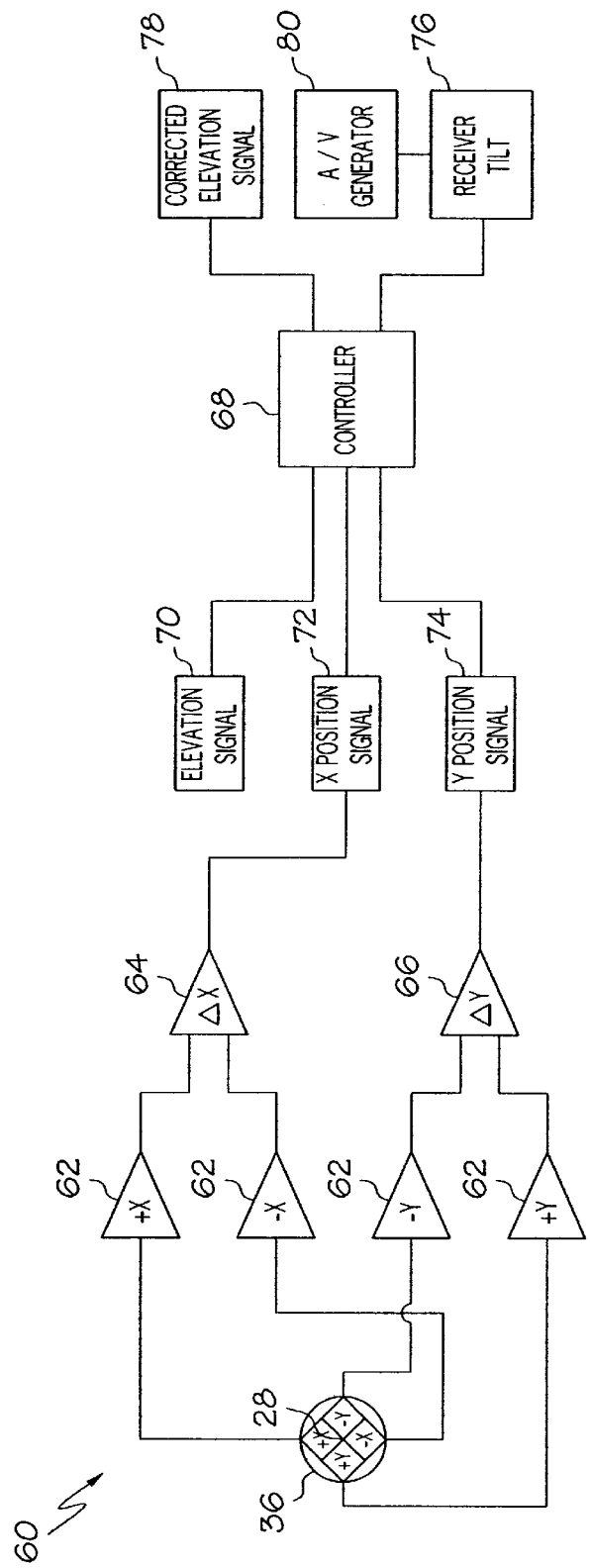
FIG. 4 is a schematic illustration of selected electronic components of the laser receiver out-of-plumb indicator and compensator of the present invention.
Figure 5:
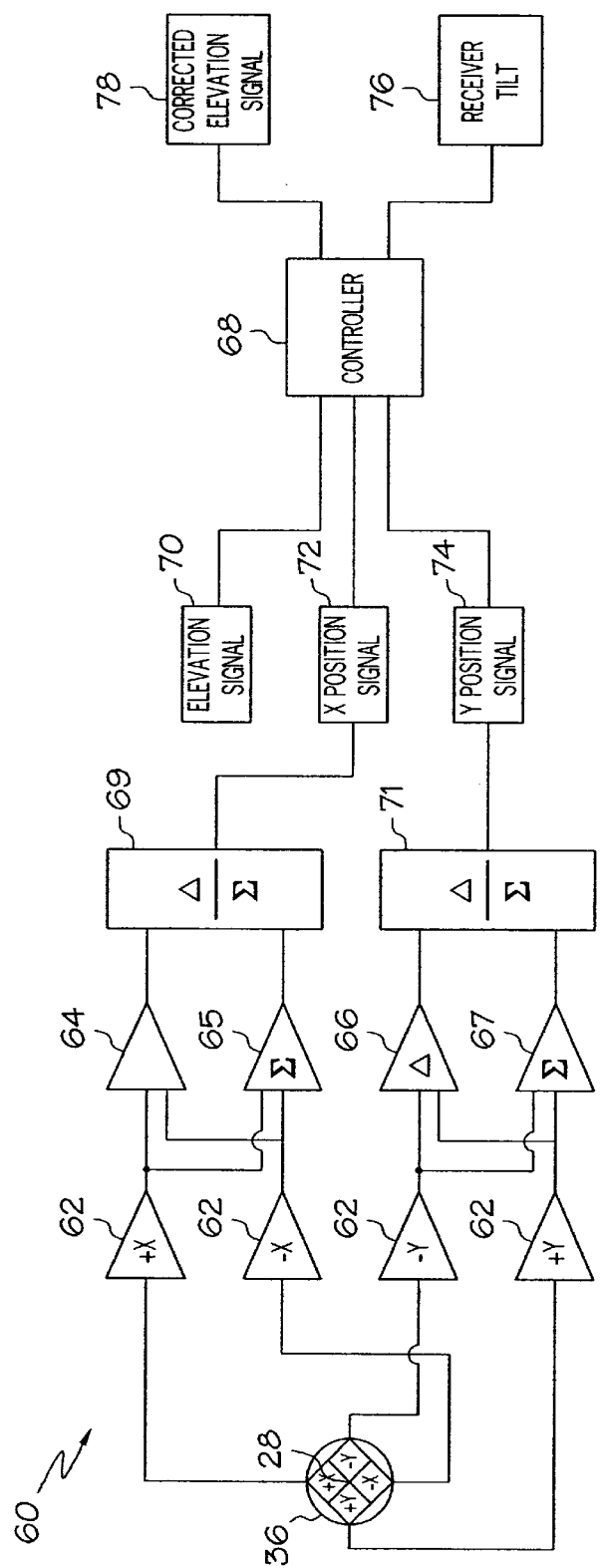
FIG. 5 is a schematic illustration of an alternative selection of electronic components of the laser receiver out-of-plumb indicator and compensator of the present invention.

Referring now to FIGS. 4 and 5, in the illustrated embodiment, the optical detector 36 comprises a conventional quadrant cell optical detector. The coordinates defined by the centroid of the output beam on the optical detector 36, relative to a centrally located vertical reference point 28, are calculated from the signals delivered by the pairs of mutually opposed quadrants +x, −x, +y, −y within the optical detector 36. More specifically, the quadrant cell optical detector 36 defines a vertical reference point 28 at the center of an X-axis and an orthogonal Y-axis. Laser receiver control circuitry 60, described in detail below, generates a receiver tilt signal 70 from a first signal x indicative of a position of a centroid of the output beam of light relative to the X-axis and a second signal y indicative of a position of a centroid of the output beam of light relative to the Y-axis.

The structural integrity of the inclination detection unit 30 of the present invention is preserved by providing a rigid optical frame 44 and a ferrule 46. The ferrule 46 is arranged about the optical fiber 34 proximate the light input end 33 and is mechanically coupled to the optical frame 44. For example, the optical fiber 34 is secured within a close-fitting bore formed in the ferrule 46 and the ferrule 46 is secured to a portion of the optical frame 44. The ferrule 46 functions to mechanically isolate the light input end 33 of the fiber 34 from the motion of the output end 35 of the optical fiber 34, which is free to move relative to the optical frame 44. In this manner, disturbances of the optical coupling between the reference light source 32 and the input end 33 of the optical fiber 34 are minimized.

The pendulum mass 48 is coupled proximate the output end 35 of the optical fiber 34 to encourage uniform, significant, and predictable motion of the optical fiber 34 as the primary receiver axis 24 tilts relative to the vertical reference axis 26. The magnetic damping mechanism 50 is arranged to damp motion of the pendulum mass 48 relative to the primary receiver axis 24. This magnetic damping reduces the effect of random vibration and other brief mechanical disturbances to the orientation of the primary receiver axis 24. The magnetic damping mechanism 50 includes a magnet assembly 52 defining a magnetic damping field region 54. The pendulum mass 48 is arranged to define a copper eddy current disk 56 configured to move through the magnetic damping field region 54 as the primary receiver axis 24 tilts relative to the vertical reference axis 26.

Referring now to FIGS. 4 and 5 two examples of suitable laser receiver control circuitry 60 for calculating the position of the centroid of the output laser beam on the optical detector 36 are described in detail. Referring initially to FIG. 4, respective output signal transimpedance amplifiers 62 are coupled to each quadrant +x, −x, +y, −y of the quadrant cell optical detector 36. Each of the X-axis signals, i.e., the signals from the +x and −x quadrants, are directed to a first difference amplifier 64 and each of the Y-axis signals, i.e., the signals from the +y and −y quadrants, are directed to a second difference amplifier 66. The output of the first difference amplifier 64 and the second difference amplifier 66 comprise X and Y position signals 72, 74 representative of respective coordinates of the position of the centroid of the output laser beam on the quadrant optical detector 36. A suitable controller 68, e.g., a digitally programmable processor circuit, inputs an elevation signal 78 from the elevation detection circuitry of the laser receiver 20 and the X and Y position signals 72, 74. Given these inputs, the controller is programmed to enable generation of a receiver tilt signal 76 and a corrected elevation signal 78.

In the embodiment of FIG. 5, respective output signal transimpedance amplifiers 62 are coupled to each quadrant +x, −x, +y, −y of the quadrant cell optical detector 36. Each of the X-axis signals, i.e., the signals from the +x and −x quadrants, are directed to a first difference amplifier 64 and to a first summing amplifier 65. Similarly, each of the Y-axis signals, i.e., the signals from the +y and −y quadrants, are directed to a second difference amplifier 66 and a second summing amplifier 67. The outputs of the first difference amplifier 64 and the first summing amplifier 65 are directed to a first divider 69 which generates an X-axis position signal proportional to the position of the centroid of the output beam along the X-axis. The outputs of the second difference amplifier 66 and the second summing amplifier 67 are directed to a second divider 71 which generates a Y-axis position signal proportional to the position of the centroid of the output beam along the Y-axis. The controller 68, e.g., a digitally programmable processor circuit, enables generation of the receiver tilt signal 76 and a corrected elevation signal 78.

The receiver tilt signal 76 may be calculated using a suitable algorithm or generated by referring to a look-up table including X and Y position signals and corresponding predetermined tilt values. The tilt values in the look up table may be determined experimentally or calculated. The tilt value or receiver tilt signal calculation is effected through the use of an algorithm that inputs the X and Y position signals, outputs the tilt value, and accounts for: (i) the mass of the pendulum mass 48; (ii) the length and rigidity of that portion 34A of the optical fiber 34 subject to bending as the receiver 20 tilts; (iii) the length of that portion 34B of the optical fiber not subject to bending, i.e., the portion that extends through the pendulum mass 48 and to the output end 35 of the optical fiber 34; and (iv) the distance between the output end 35 of the optical fiber 34 and the input face of the optical detector 36.

As will be appreciated from the geometries and physics of the arrangement of the illustrated embodiment additional physical constants and variations of the above physical constants may be incorporated into a suitable algorithm to yield a more accurate or more readily computable tilt value or receiver tilt signal. According to one embodiment of the present invention, utilizing a quartz optical fiber with an outer radius of 220$\mu$, as identified above, the length of the optical fiber portion 34A is about 0.475" (1.2 cm), the length of the optical fiber portion 34B is about 0.435" (1.1 cm), the mass of the pendulum is about 0.0136 lbs (6.2 g), and the distance between the output end 35 of the optical fiber 34 and the input face of the optical detector 36 is about 0.010" (0.0254 cm).

The controller 68 generates a corrected elevation signal 78 by reducing the artificially large elevation signal, described above with reference to FIG. 2, by a value that is proportional to the degree to which the primary receiver axis 24 tilts relative to the vertical reference axis 26. Specifically, if the receiver tilt signal 76 indicates a tilt angle of 10°, then the artificially high elevation signal is reduced through multiplication by the cosine of 10° or some other equivalent reduction in the value of the artificially high elevation signal. In the embodiment of the present invention illustrated in FIG. 4, an A/V generator 80 is provided to enable generation of an audible tilt warning when the receiver tilt signal 76 exceeds a predetermined value. The A/V generator is also provided to enable generation of a visual representation of the current receiver tilt signal 76.

Having described the invention in detail and by reference to preferred embodiments thereof, it will be apparent that modifications and variations are possible without departing from the scope of the invention defined in the appended claims.

What is claimed is:

1. A laser receiver defining a primary receiver axis and comprising:
   a laser beam detection unit arranged to enable production of an elevation signal indicative of an elevation of a laser beam relative to said laser receiver;
   an inclination detection unit comprising
      a reference light source,
      an optical fiber defining a light input end and a light output end, wherein said optical fiber is coupled to said reference light source such that light from said reference light source enters at said light input end and exits from said light output end as an output beam of light, and
      an optical detector arranged to receive said output beam of light, wherein said inclination detection unit is arranged to permit said output end of said optical fiber to move relative to said optical detector as said primary receiver axis tilts relative to a vertical reference axis, and wherein said optical detector is arranged to produce an optical detection signal indicative of a position of said output beam on said optical detector; and
   laser receiver control circuitry arranged to
      generate a receiver tilt signal from said optical detection signal, wherein said receiver tilt signal is indicative of a degree to which said primary receiver axis is tilted relative to said vertical reference axis, and
      correct said elevation signal as a function of said receiver tilt signal.

2. A laser receiver as claimed in claim 1 wherein said inclination detection unit further comprises an index matching compound positioned in an optical path defined between said reference light source and said light input end of said optical fiber.

3. A laser receiver as claimed in claim 2 wherein said index matching compound is arranged to bond said reference light source to said light input end of said optical fiber.

4. A laser receiver as claimed in claim 1 wherein said inclination detection unit further comprises an input lens positioned in an optical path defined between said reference light source and said light input end of said optical fiber, wherein said input lens is arranged to direct light from said reference light source into said input end of said optical fiber.

5. A laser receiver as claimed in claim 1 wherein said inclination detection unit further comprises an optical frame and a ferrule arranged about said optical fiber proximate said light input end, wherein said ferrule is mechanically coupled to said optical frame and is arranged to mechanically isolate said light input end from fiber movement proximate said light output end of said optical fiber.

6. A laser receiver as claimed in claim 1 wherein said inclination detection unit further comprises:
   a pendulum mass coupled to said optical fiber proximate said light output end of said optical fiber; and
   a magnetic damping mechanism arranged to damp motion of said pendulum mass relative to said primary receiver axis.

7. A laser receiver as claimed in claim 6 wherein said magnetic damping mechanism includes a magnet assembly defining a magnetic damping field and wherein said pendulum mass is arranged to define an eddy current disk configured to move through said magnetic damping field as said primary receiver axis tilts relative to said vertical reference axis.

8. A laser receiver as claimed in claim 1 wherein said output end of said optical fiber is provided with an output lens arranged to focus said output beam of light on said optical detector.

9. A laser receiver as claimed in claim 1 wherein said optical detector comprises a quadrant cell optical detector.

10. A laser receiver as claimed in claim 1 wherein said optical detector defines a vertical reference point at the center of an X-axis and an orthogonal Y-axis and wherein said laser receiver control circuitry is operative to generate said receiver tilt signal from a first signal x indicative of a position of a centroid of said output beam of light relative to said X-axis and a second signal y indicative of a position of a centroid of said output beam of light relative to said Y-axis.

11. A laser receiver as claimed in claim 1 wherein said receiver control circuitry is arranged to correct said elevation signal by reducing an elevation value corresponding to said elevation signal, wherein said reduction is a function of a degree of receiver tilt.

12. A laser receiver as claimed in claim 1 wherein said receiver is arranged such that said laser beam detection unit produces an artificially high elevation signal when said primary receiver axis is tilted relative to said vertical reference axis, and wherein said receiver control circuitry is arranged to correct said artificially high elevation signal by determining a degree of said tilt and reducing said elevation signal according to said degree of tilt.

13. A laser receiver as claimed in claim 1 wherein said receiver further comprises an audible signal generator responsive to said receiver tilt signal, wherein said audible signal generator is arranged to generate an audible tilt warning when said receiver tilt signal exceeds a predetermined value.

14. A laser receiver as claimed in claim 1 wherein said receiver further comprises a visual signal generator responsive to said receiver tilt signal, wherein said visual signal generator is arranged to generate a visual representation of said receiver tilt signal.

15. A laser receiver defining a primary receiver axis and comprising:
  a laser beam detection unit arranged to enable production of an elevation signal indicative of an elevation of a laser beam relative to said laser receiver;
  an inclination detection unit comprising
    a reference light source,
    an optical fiber defining a light input end and a light output end, wherein said optical fiber is coupled to said reference light source such that light from said reference light source enters at said light input end and exits from said light output end as an output beam of light,
    an optical detector arranged to receive said output beam of light, wherein said inclination detection unit is arranged to permit said output end of said optical fiber to move relative to said optical detector as said primary receiver axis tilts relative to a vertical reference axis, and wherein said optical detector is arranged to produce an optical detection signal indicative of a position of said output beam on said optical detector,
    a pendulum mass coupled to said optical fiber proximate said light output end of said optical fiber, and
    a magnetic damping mechanism arranged to damp motion of said pendulum mass relative to said primary receiver axis, wherein said magnetic damping mechanism includes a magnet assembly defining a magnetic damping field, and wherein said pendulum mass is arranged to define an eddy current disk configured to move through said magnetic damping field as said primary receiver axis tilts relative to said vertical reference axis; and
  laser receiver control circuitry arranged to generate a receiver tilt signal from said optical detection signal, wherein said receiver tilt signal is indicative of a degree to which said primary receiver axis is tilted relative to said vertical reference axis.

16. A laser receiver as claimed in claim 15 wherein said inclination detection unit further comprises:
  an index matching compound positioned in an optical path defined between said reference light source and said light input end of said optical fiber;
  an input lens positioned in an optical path defined between said reference light source and said light input end of said optical fiber, wherein said input lens is arranged to direct light from said reference light source into said input end of said optical fiber;
  a ferrule arranged about said optical fiber proximate said light input end and arranged to mechanically isolate said light input end from fiber movement proximate said light output end of said optical fiber; and
  an output lens arranged to focus said output beam of light on said optical detector.

17. A laser receiver defining a primary receiver axis and comprising:
  a laser beam detection unit arranged to enable production of an elevation signal indicative of an elevation of a laser beam relative to said laser receiver;
  an inclination detection unit comprising
    a reference light source,
    an optical fiber defining a light input end and a light output end, wherein said optical fiber is coupled to said reference light source such that light from said reference light source enters at said light input end and exits from said light output end as an output beam of light,
    an optical detector arranged to receive said output beam of light, wherein said inclination detection unit is arranged to permit said output end of said optical fiber to move relative to said optical detector as said primary receiver axis tilts relative to a vertical reference axis, and wherein said optical detector is arranged to produce an optical detection signal indicative of a position of said output beam on said optical detector,
    an index matching compound positioned in an optical path defined between said reference light source and said light input end of said optical fiber,
    an input lens positioned in an optical path defined between said reference light source and said light input end of said optical fiber, wherein said input lens is arranged to direct light from said reference light source into said input end of said optical fiber,
    a ferrule arranged about said optical fiber proximate said light input end of said optical fiber, wherein said ferrule is arranged to mechanically isolate said light input end from fiber movement proximate said light output end of said optical fiber, and
    an output lens arranged to focus said output beam of light on said optical detector; and
  laser receiver control circuitry arranged to generate a receiver tilt signal from said optical detection signal, wherein said receiver tilt signal is indicative of a degree to which said primary receiver axis is tilted relative to said vertical reference axis.

18. A laser receiver as claimed in claim 17 wherein said inclination detection unit further comprises:
  a pendulum mass coupled to said optical fiber proximate said light output end of said optical fiber; and
  a magnetic damping mechanism arranged to damp motion of said pendulum mass relative to said primary receiver axis.

19. A laser receiver as claimed in claim 18 wherein said magnetic damping mechanism includes a magnet assembly defining a magnetic damping field and wherein said pendulum mass is arranged to define an eddy current disk configured to move through said magnetic damping field as said primary receiver axis tilts relative to said vertical reference axis.

* * * * *